US011984099B2

(12) United States Patent
Saka et al.

(10) Patent No.: US 11,984,099 B2
(45) Date of Patent: May 14, 2024

(54) DRUM HEAD AND ATTACHMENT METHOD OF CUSHION

(71) Applicant: Roland Corporation, Shizuoka (JP)

(72) Inventors: Takuma Saka, Shizuoka (JP); Kenji Sakamoto, Shizuoka (JP)

(73) Assignee: Roland Corporation, Shizuoka (JP)

( * ) Notice: Subject to any disclaimer, the term of this patent is extended or adjusted under 35 U.S.C. 154(b) by 22 days.

(21) Appl. No.: 17/109,148

(22) Filed: Dec. 2, 2020

(65) Prior Publication Data

US 2021/0201860 A1 Jul. 1, 2021

(30) Foreign Application Priority Data

Dec. 25, 2019 (JP) ................................ 2019-234965

(51) Int. Cl.
*G10D 13/14* (2020.01)
*G10D 13/02* (2020.01)
*G10D 13/20* (2020.01)

(52) U.S. Cl.
CPC ............ *G10D 13/14* (2020.02); *G10D 13/02* (2013.01); *G10D 13/20* (2020.02)

(58) Field of Classification Search
CPC ......... G10D 13/14; G10D 13/20; G10D 13/02
See application file for complete search history.

(56) References Cited

U.S. PATENT DOCUMENTS 2,565,225 A 8/1951 Gladstone
4,227,049 A * 10/1980 Thomson ................. G10H 1/12 84/DIG. 12
4,244,266 A 1/1981 Hardy
4,325,281 A 4/1982 Hardy
4,679,479 A 7/1987 Koyamato
5,892,168 A 4/1999 Donohoe
6,291,754 B1 9/2001 Gatzen et al.
6,518,490 B2 2/2003 Good
8,148,619 B1 4/2012 May et al.
8,916,759 B2 12/2014 Hashimoto
9,190,037 B2 11/2015 May
9,190,040 B2 11/2015 Hashimoto
9,257,107 B1 * 2/2016 Belli ...................... G10D 13/20

(Continued)

FOREIGN PATENT DOCUMENTS

JP 2009128427 A * 6/2009
JP 2014056177 3/2014

(Continued)

OTHER PUBLICATIONS

"Search Report of Europe Counterpart Application", dated May 19, 2021, p. 1-p. 12.

(Continued)

*Primary Examiner* — Jianchun Qin
(74) *Attorney, Agent, or Firm* — JCIPRNET

(57) ABSTRACT

A drum head and an attachment method of a cushion are provided. A drum head includes: a diaphragm; an outer cushion that is joined to the diaphragm and has a predetermined cushioning property; an inner cushion that is interposed between the outer cushion and the diaphragm and has a predetermined cushioning property; and at least one joint that joins the outer cushion to the diaphragm in a state in which the inner cushion is pressed against the diaphragm by the outer cushion.

19 Claims, 8 Drawing Sheets

(56) References Cited

U.S. PATENT DOCUMENTS

| | | | | |
|---|---|---|---|---|
| 9,396,712 | B1 * | 7/2016 | Dunnett ................. | G10D 13/20 |
| 10,163,426 | B2 * | 12/2018 | Yoshino ................. | G10D 13/14 |
| 2014/0260920 | A1 * | 9/2014 | Kanayama ............. | G10D 13/02 84/730 |
| 2019/0213983 | A1 | 7/2019 | Motohashi et al. | |

FOREIGN PATENT DOCUMENTS

| | | |
|---|---|---|
| WO | 2017038226 | 3/2017 |
| WO | 2019180807 | 9/2019 |

OTHER PUBLICATIONS

"Office Action of Europe Counterpart Application", dated Feb. 10, 2022, p. 1-p. 9.
"Office Action of Europe Counterpart Application", dated Jun. 30, 2022, p. 1-p. 7.
"Office Action of Europe Counterpart Application", dated Dec. 13, 2022, p. 1-p. 10.

* cited by examiner

DRUM HEAD AND ATTACHMENT METHOD OF CUSHION

CROSS-REFERENCE TO RELATED APPLICATIONS

This application claims the priority benefit of Japanese Patent Application No. 2019-234965, filed on Dec. 25, 2019. The entirety of the above-mentioned patent application is hereby incorporated by reference herein and made a part of this specification.

BACKGROUND

Technical Field

The disclosure relates to a drum head and an attachment method of a cushion, and particularly to a drum head and an attachment method of a cushion capable of effectively reducing a sound generated when the drum head is struck.

Description of Related Art

There is a technique for reducing the sound generated when a diaphragm of a drum head is struck by affixing a cushion having a cushioning property to the diaphragm. If the entire surface of the cushion is adhered to the diaphragm, the cushion and the diaphragm vibrate integrally, and thus the sound cannot be sufficiently reduced.

On the other hand, Patent Document 1 describes a technique of adhering an outer edge of a striking surface side mass imparting member 13 to the diaphragm of a drum head. As in this technique, by adhering only the outer edge of the cushion to the diaphragm, the diaphragm and the cushion can vibrate separately (with different behaviors) when the diaphragm is struck. Therefore, as compared with the case in which the entire surface of the cushion is adhered to the diaphragm, the sound generated when the diaphragm is struck is more likely to be reduced.

PATENT DOCUMENTS

[Patent Document 1] Japanese Patent Laid-Open No. 2014-056177 (for example, Paragraphs 0044 and 0045, and FIG. 1)

In this type of drum head, there is a demand for a technique for more effectively reducing the sound generated when it is struck.

SUMMARY

The disclosure provides a drum head and an attachment method of a cushion capable of effectively reducing the sound generated when the drum head is struck.

According to an embodiment, there is provided a drum head including a diaphragm; an outer cushion that is joined to the diaphragm and has a predetermined cushioning property; an inner cushion that is interposed between the outer cushion and the diaphragm and has a predetermined cushioning property; and at least one joint that joins the outer cushion to the diaphragm in a state in which the inner cushion is pressed against the diaphragm by the outer cushion.

According to another embodiment, there is provided an attachment method of a cushion in a drum head, the drum head including a diaphragm; and the cushion that includes an outer cushion and an inner cushion which are joined to the diaphragm and have a predetermined cushioning property, the method including a first step of joining the inner cushion to the diaphragm; and a second step of, after the first step, joining the outer cushion to the diaphragm by pressing the inner cushion is pressed against the diaphragm by the outer cushion.

DESCRIPTION OF THE EMBODIMENTS

Figure 1A:
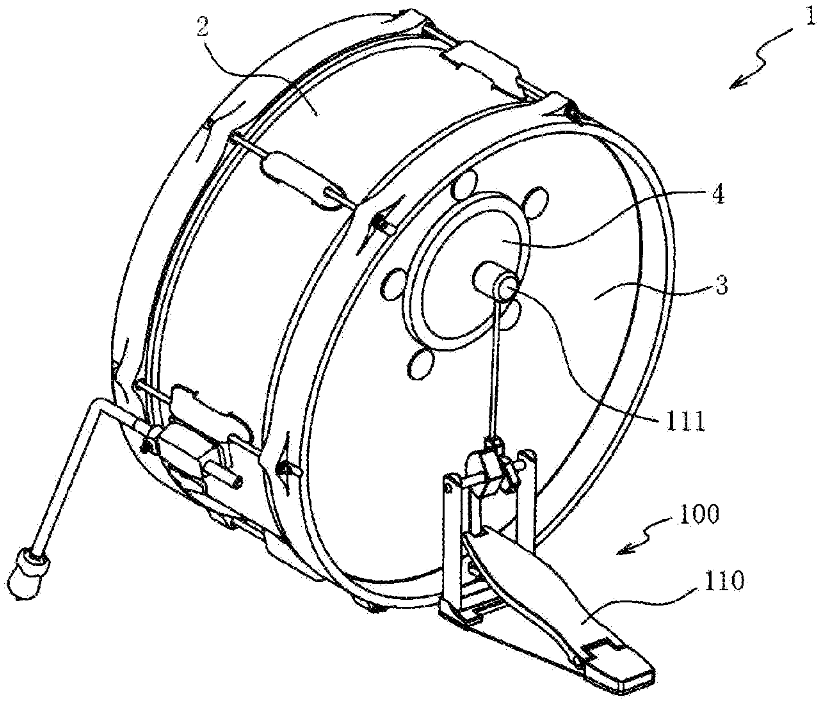
FIG. 1(*a*) is a perspective view of a drum according to an embodiment, and FIG. 1(*b*) is a front view of the drum.
Figure 1B:
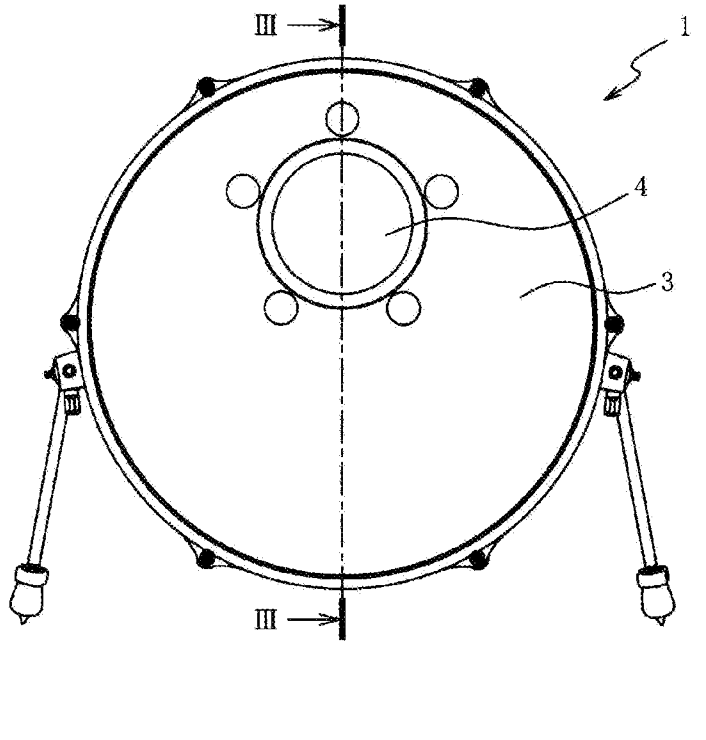

Hereinafter, preferred embodiments will be described with reference to the accompanying drawings. First, the overall configuration of the drum 1 will be described with reference to FIG. 1. FIG. 1(*a*) is a perspective view of a drum 1 according to an embodiment, and FIG. 1(*b*) is a front view of the drum 1.

As shown in FIG. 1, the drum 1 is a percussion instrument (a bass drum) in which an end of a cylindrical shell 2 is closed by a striking surface head 3. The striking surface head 3 is struck by a foot pedal 100. The foot pedal 100 strikes the striking surface head 3 with a beater 111 that rotates in response to the depression of the pedal 110.

A sensor part 4 is installed on a portion of the striking surface head 3 which is struck by the beater 111. The sensor part 4 includes a sensor (not shown) for detecting vibration due to the striking by the beater 111. Therefore, when the striking by the beater 111 is detected by the sensor part 4, a musical sound signal based on the detection result is generated by a sound source (not shown). When the musical sound signal is output to an amplifier or a speaker (neither is shown), an electronic musical sound is emitted from the speaker.

That is, the drum 1 is configured as an electronic drum, and the sensor part 4 is a striking position for a performer, but in the drum 1 in which the sensor part 4 is not installed, the striking surface head 3 is the striking position for the performer.

Figure 2:
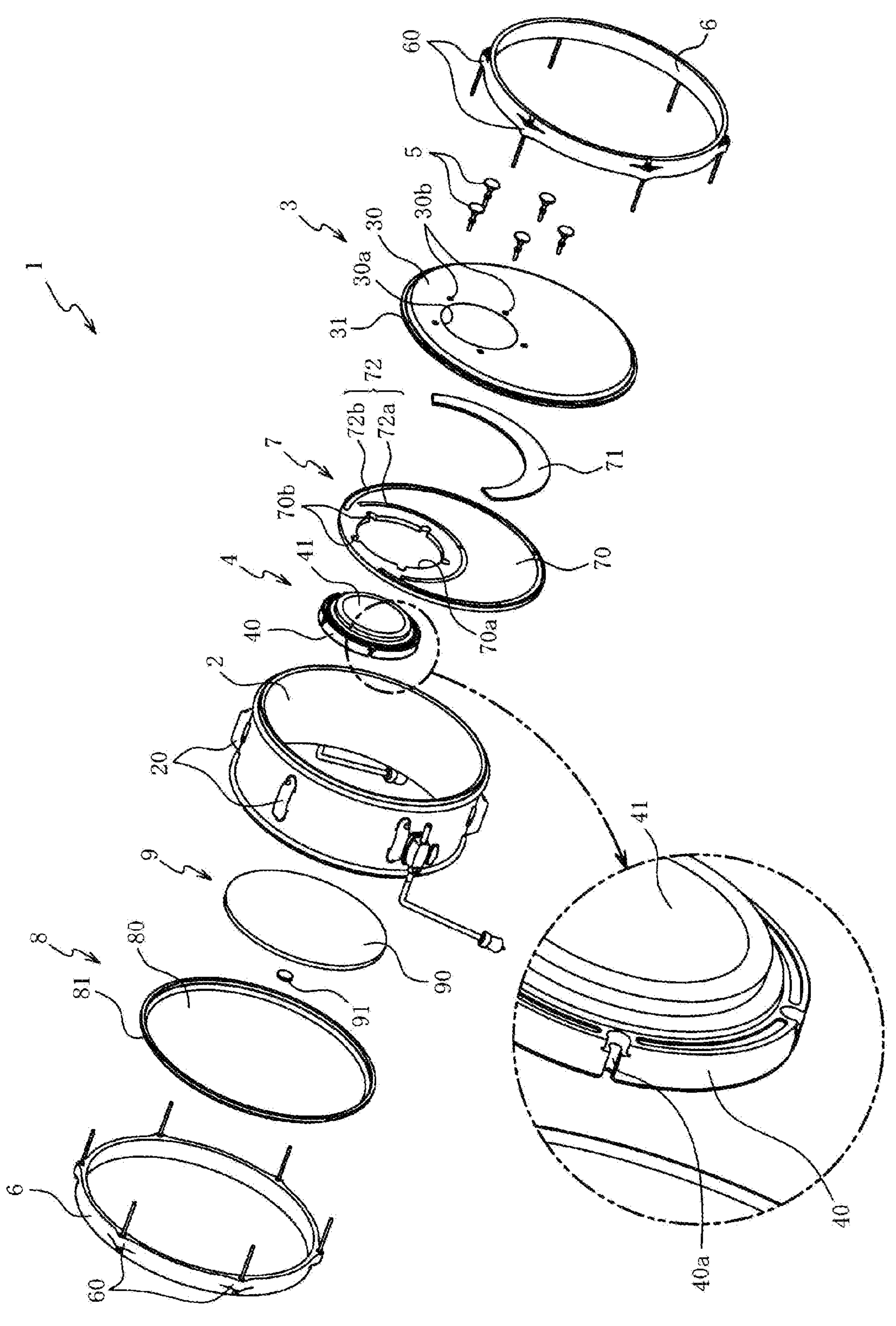
FIG. 2 is an exploded perspective view of the drum.
Figure 3:
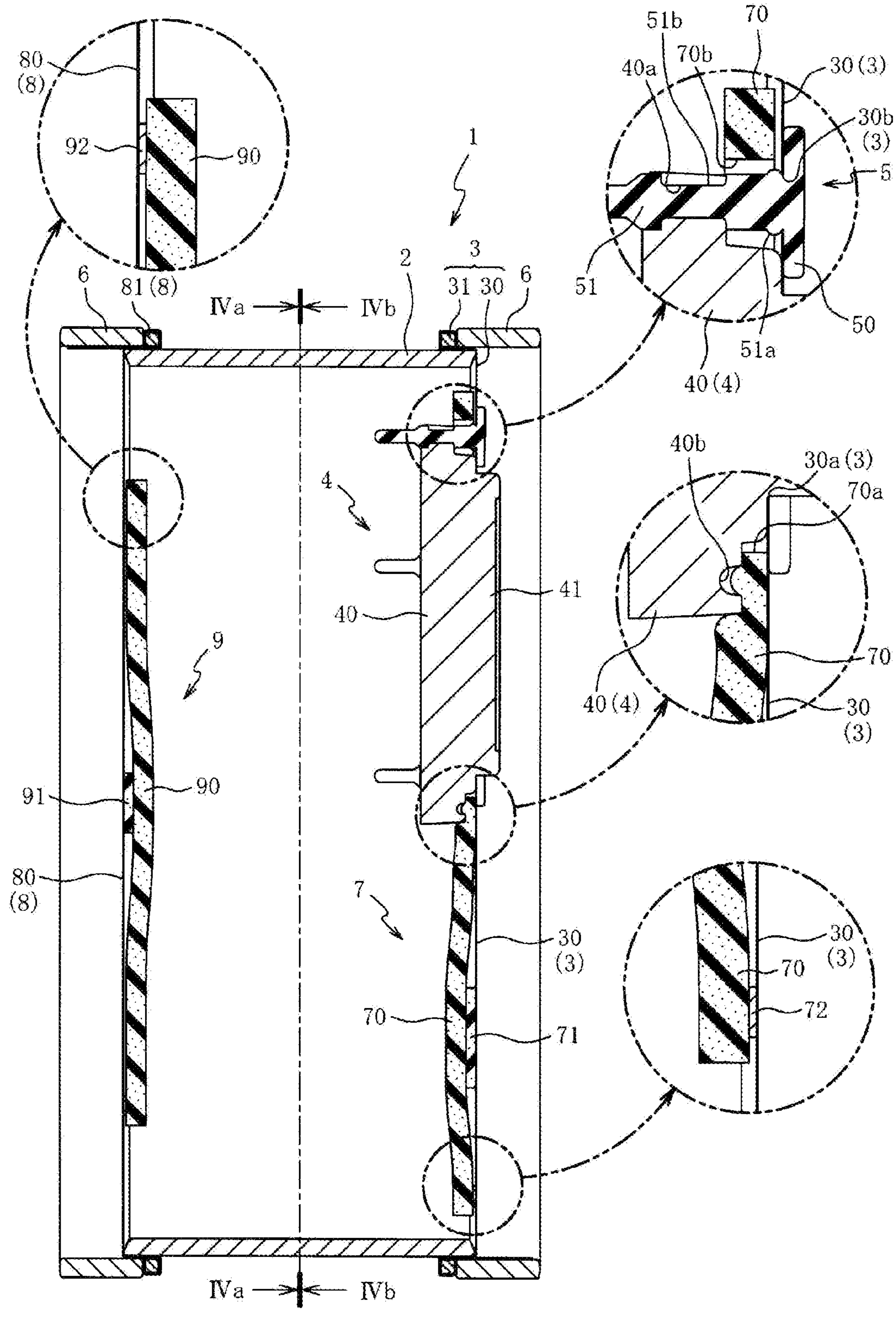
FIG. 3 is a cross-sectional view of the drum along line III-III of FIG. 1(*b*).
Figure 4A:
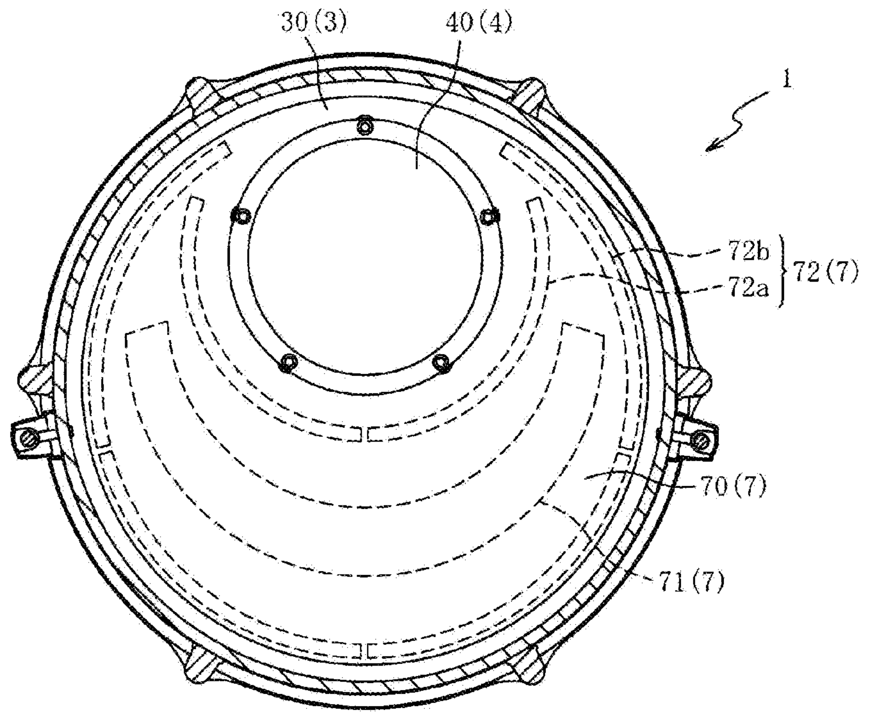
FIG. 4(*a*) is a cross-sectional view of the drum along line IVa-IVa of FIG. 3, and FIG. 4(*b*) is a cross-sectional view of the drum along line IVb-IVb of FIG. 3.
Figure 4B:
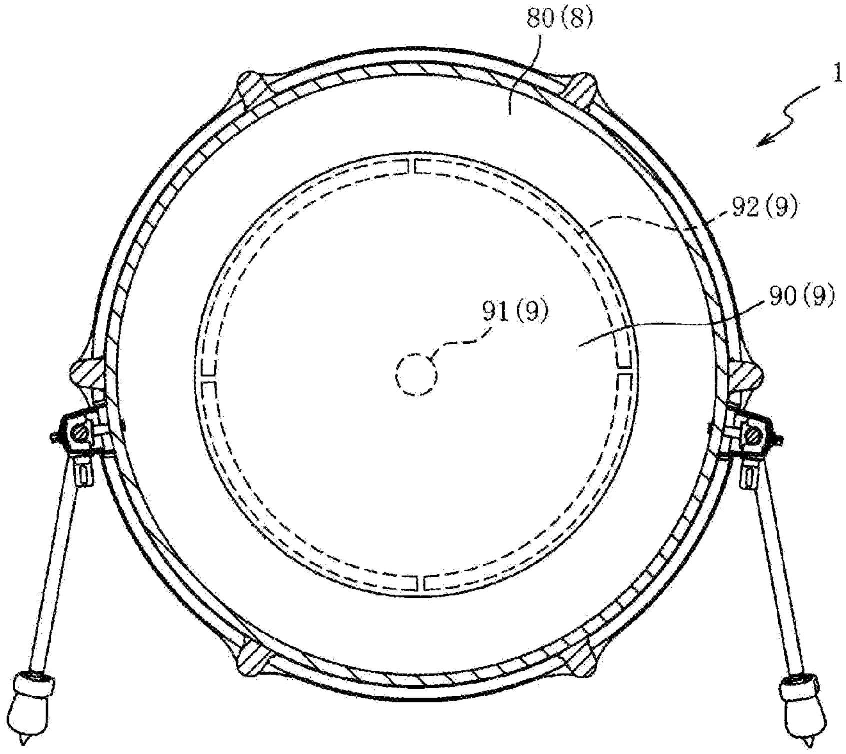
Figure 5A:
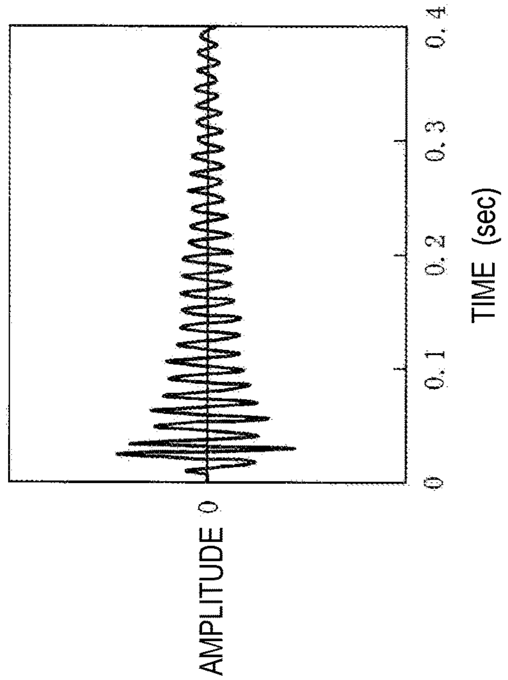
FIG. 5(*a*) is a graph showing a result of a drum striking test of a first comparative example, FIG. 5(*b*) is a graph showing a result of a drum striking test of a second comparative example, FIG. 5(*c*) is a graph showing a result of a drum striking test of a third comparative example, and FIG. 5(*d*) is a graph showing a result of a drum striking test of the embodiment.
Figure 5B:
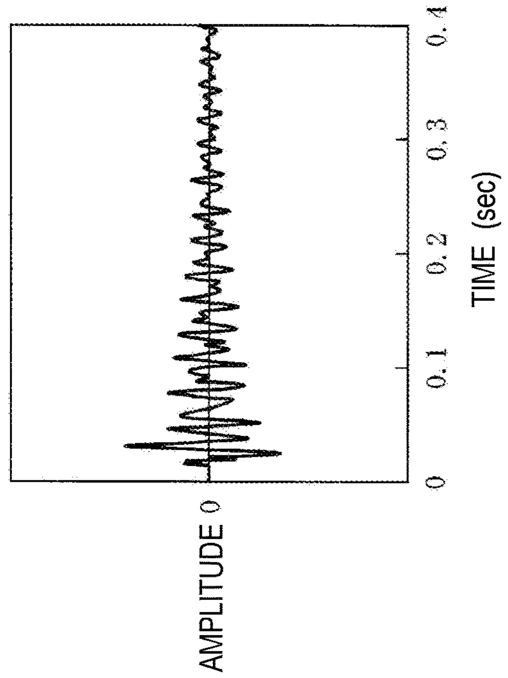
Figure 5C:
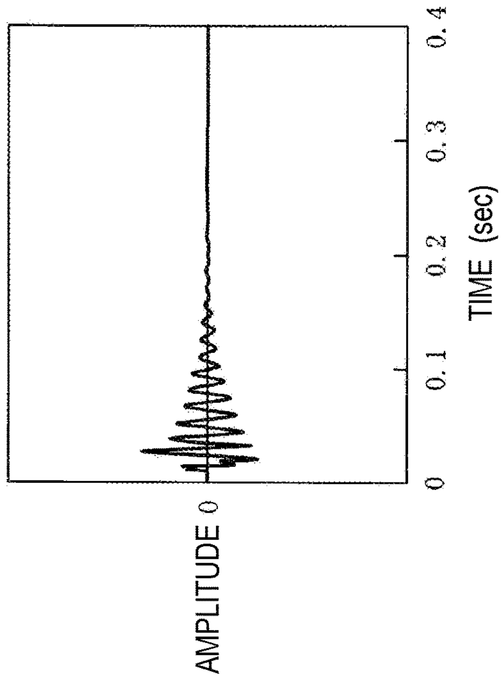
Figure 5D:
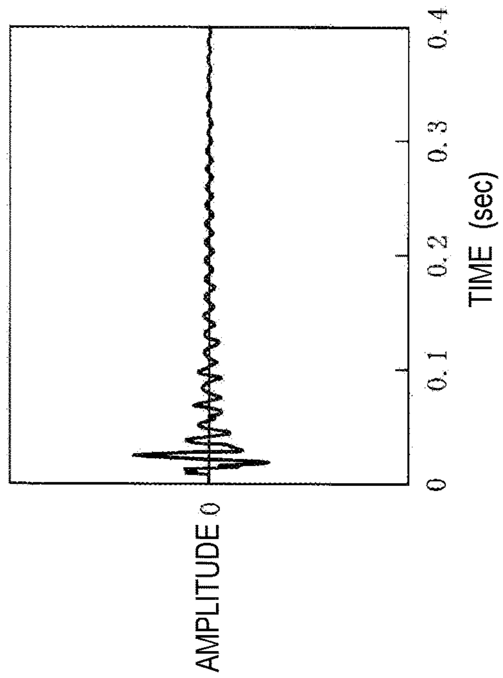

Next, a detailed configuration of the drum 1 will be described with reference to FIGS. 2 to 4(*a*) and 4(*b*). FIG. 2 is an exploded perspective view of the drum 1, and FIG. 3 is a cross-sectional view of the drum 1 along line III-III of FIG. 1(*b*). FIG. 4(*a*) is a cross-sectional view of the drum 1 along line IVa-IVa of FIG. 3, and FIG. 4(*b*) is a cross-sectional view of the drum 1 along line IVb-IVb of FIG. 3.

In addition, to simplify the drawing, in FIG. 3, an internal structure of the sensor part 4 is not shown, and the sensor part is shown with hatching. Further, in FIG. 4, an inner cushion 71 and a double-sided tape 72 of a cushion 7 and an inner cushion 91 and a double-sided tape 92 of a cushion 9 are shown by broken lines.

As shown in FIGS. 2 and 3, the striking surface head 3 includes a disc-shaped diaphragm 30 formed using a film made of a synthetic resin. The diaphragm 30 has a circular first through hole 30*a* for fitting the sensor part 4 (see FIG. 2) and a plurality of (five in the embodiment) second through holes 30*a* surrounding the first through hole 30*a*. The second through hole 30*b* is a hole for press-fitting a fixture 5 which is used when the sensor part 4 is fixed to the diaphragm 30. The fixture 5 is a pin made of an elastomer (or rubber). That is, the sensor part 4 is fixed to the striking surface head 3 by fixing the sensor part 4 fitted in the first through hole 30*a* with the fixture 5 fitted in the second through hole 30*b*.

Specifically, the sensor part 4 is constituted by a disc 40 and a protrusion 41 that protrudes from a surface of the disc 40 (a surface on the diaphragm 30 side) and is formed in a disc shape having a diameter smaller than that of the disc 40. The disc 40 and the protrusion 41 are formed concentrically with each other.

A plurality of (five in the embodiment) press-fitting holes 40*a* are formed on an outer peripheral surface of the disc 40 at equal intervals in a circumferential direction. The press-fitting hole 40*a* is a hole into which a shaft 51 (see FIG. 3) of the fixture 5 is press-fitted.

As shown in FIG. 3, the fixture 5 is constituted by a disc-shaped head part 50 and the shaft 51 protruding in a thickness direction of the head part 50. The diameter of the head part 50 is formed to be larger than the diameter of the second through hole 30*b* of the striking surface head 3.

The shaft 51 has an annulus 51*a* for latching the diaphragm 30 of the striking surface head 3 and a recess 51*b* for latching the press-fitting hole 40*a* of the sensor part 4. The annulus 51*a* protrudes in an annular shape with a space corresponding to a diaphragm thickness of the diaphragm 30 between the annulus and the head part 50, and the outer diameter of the annulus 51*a* is formed to be slightly larger than the diameter of the second through hole 30*b* of the diaphragm 30. Therefore, by press-fitting the annulus 51*a* into the second through hole 30*b* of the diaphragm 30, the diaphragm 30 is latched between the head part 50 and the annulus 51*a*.

The recess 51*b* is a recess extending in a circumferential direction of the shaft 51, and in a region where the recess 51*b* is formed, the diameter of the shaft 51 is set to be the same as the inner diameter of the press-fitting hole 40*a* of the sensor part 4. Therefore, by press-fitting the shaft 51 into the press-fitting hole 40*a* of the sensor part 4, the disc 40 of the sensor part 4 is latched to the recess 51*b*. Accordingly, the sensor part 4 is installed on the striking surface head 3 by the fixture 5.

Then, the striking surface head 3 on which the sensor part 4 is installed is fixed to the shell 2 by a hoop 6. A frame 31 formed of a metal or a resin material is connected (fixed) to an outer edge side of the diaphragm 30 of the striking surface head 3. As shown in FIG. 2, both the frame 31 and the hoop 6 are formed in an annular shape, and a plurality of fastening target parts 60 are formed in the hoop 6 at equal intervals in the circumferential direction. A plurality of fastening parts 20 are formed on an outer peripheral surface of the shell 2 at positions corresponding to the fastening target parts 60, and the fastening target parts 60 of the hoop 6 can be screwed to the plurality of fastening parts 20.

The diameter of each of the hoop 6 and the frame 31 is formed to be slightly larger than the outer diameter of the shell 2. Therefore, in a state in which the hoop 6 is latched to the frame 31 disposed on the outer peripheral side of the shell 2, by screwing the fastening target parts 60 of the hoop 6 to the fastening parts 20 of the shell 2, tension is applied to the diaphragm 30 of the striking surface head 3. Accordingly, the performer can strike the sensor part 4, but the diaphragm 30 also vibrates when the sensor part 4 is struck. The vibration of the diaphragm 30 is damped by the cushion 7.

The cushion 7 is affixed to a back surface (a surface opposite to the surface to be struck) of the diaphragm 30 of the striking surface head 3. As shown in FIG. 2, the cushion 7 is constituted by a disc-shaped outer cushion 70 and the inner cushion 71 having a C shape.

Both the outer cushion 70 and the inner cushion 71 are formed using a foamed synthetic resin of polyurethane foam, and have a predetermined cushioning property. The outer cushion 70 is partially adhered to the diaphragm 30 by the double-sided tape 72 (hereinafter referred to as "partial adhesion"), and the inner cushion 71 is entirely adhered to the diaphragm 30 by the double-sided tape (not shown). In entire adhesion, the entire surface of the inner cushion 71 is adhered to the diaphragm 30.

As shown in FIG. 3, the outer cushion 70 is affixed to the diaphragm 30 by the double-sided tape 72 in a state in which the inner cushion 71 is interposed between the outer cushion and the diaphragm 30. Then, the inner cushion 71 is disposed in a region surrounded by the double-sided tape 72 (the adhesion portion between the diaphragm 30 and the outer cushion 70). Accordingly, the inner cushion 71 is pressed against the diaphragm 30 by the outer cushion 70, and the inner cushion 71 is in a compressed state, and thus the vibration of the diaphragm 30 is easily damped by the inner cushion 71.

That is, by pressing the inner cushion 71 against the diaphragm 30, the double-sided tape 72 (the adhesion portion between the diaphragm 30 and the outer cushion 70) and the adhesion portion of the inner cushion 71 become a vibration node of the diaphragm 30.

Accordingly, a vibration region of the diaphragm 30 is divided, and thus a vibration amplitude of the diaphragm 30 can be easily reduced as compared with the case in which only the outer cushion 70 is partially adhered to the diaphragm 30, for example. Therefore, the vibration of the diaphragm 30 is easily damped by the cushion 7, and thus the sound generated when the diaphragm 30 of the striking surface head 3 is struck can be effectively reduced.

In this way, in a case in which the vibration of the diaphragm 30 of the striking surface head 3 is damped by the cushion 7, the cushion 7 can also be provided only in a part of a region avoiding the sensor part 4, for example. However, in such a configuration, the effect of damping the vibration by the cushion 7 is reduced, and thus, in the embodiment, the cushion 7 can be affixed to almost the entire region of the diaphragm 30.

Specifically, the diameter of the outer cushion 70 is formed to be slightly smaller than the diameter of the diaphragm 30 (the inner diameter of the shell 2), and as shown in FIG. 2, the outer cushion 70 has a circular through hole 70*a* and a cutout 70*b* formed to cut out the edge portion of the through hole 70*a*. The through hole 70*a* is a portion for fitting the sensor part 4, and the cutout 70*b* is a portion for inserting the fixture 5.

The through hole 70*a* is formed at a position eccentric from the center of the outer cushion 70, and a plurality of cutouts 70*b* are formed at equal intervals in the circumferential direction of the through hole 70*a*. That is, when the outer cushion 70 is affixed to the diaphragm 30, the through hole 70*a* of the outer cushion 70 is formed at a position overlapping the first through hole 30*a* of the diaphragm 30, and the cutouts 70*b* are formed at positions overlapping the second through holes 30*b* of the diaphragm 30. Further, the diameter of the through hole 70*a* is formed to be slightly larger than the diameter of the first through hole 30*a* of the diaphragm 30.

Accordingly, the sensor part 4 can be installed on the diaphragm 30 of the striking surface head 3 in a state in which the protrusion 41 of the sensor part 4 is inserted into the through hole 70*a* of the outer cushion 70. That is, it is configured such that the sensor part 4 can be fixed to the diaphragm 30 through the through hole 70*a* of the outer cushion 70, and thus the outer cushion 70 can be affixed to almost the entire region of the diaphragm 30. Since the outer cushion 70 has not only a function of pressing the inner cushion 71 against the diaphragm 30 but also a function of damping the vibration by being in contact with the diaphragm 30, by affixing the outer cushion 70 to almost the entire region of the diaphragm 30, the vibration of the diaphragm 30 is easily damped by the outer cushion 70. Further, almost the entire region of the diaphragm 30 is a region that is 70% or more of the area (the vibration region) of the diaphragm 30.

On the other hand, in a case in which the through hole 70*a* or the cutouts 70*b* are formed in the outer cushion 70, when the outer cushion 70 is affixed to the diaphragm 30 of the striking surface head 3, it is necessary to position the through hole 70*a* and the cutouts 70*b* with respect to the first through hole 30*a* and the second through holes 30*b*. However, in the embodiment, the diameter of the through hole 70*a* of the outer cushion 70 is formed to be larger than the diameter of the first through hole 30*a* of the diaphragm 30, and the width dimension of the cutout 70*b* in the circumferential direction of the through hole 70*a* is formed to be larger than the diameter of the second through hole 30*b* of the diaphragm 30. Therefore, positioning when the outer cushion 70 is affixed to the diaphragm 30 can be easily performed.

Further, the diameter of the through hole 70*a* of the outer cushion 70 is set to be smaller than the diameter of the disc 40 of the sensor part 4. Therefore, as shown in FIG. 3, in a state in which the sensor part 4 is installed on the striking surface head 3, the periphery of the through hole 70*a* of the outer cushion 70 is fixed between the diaphragm 30 of the striking surface head 3 and the disc 40 of the sensor part 4 while interposed therebetween. Accordingly, it is possible to prevent the periphery of the through hole 70*a* from coming off the diaphragm 30.

Further, in a state in which the sensor part 4 is fixed to the striking surface head 3, a gap is formed between an outer edge portion of the disc 40 of the sensor part 4 and the diaphragm 30, and the outer cushion 70 is interposed in the gap. Then, in a region where the gap is formed, a groove 40*b* recessed on a side opposite to the diaphragm 30 side is formed in the disc 40. Accordingly, the outer cushion 70 is interposed between the outer edge portion of the disc portion 40 and the diaphragm 30, and thus the outer cushion 70 is deformed to bite into the groove 40*b* of the disc 40. Therefore, it is possible to more effectively prevent the periphery of the through hole 70*a* from coming off the diaphragm 30.

Further, as shown in FIG. 2, the double-sided tape 72 for adhering the outer cushion 70 to the diaphragm 30 includes a first adhesion part 72*a* for adhering the periphery of the through hole 70*a* of the outer cushion 70 to the diaphragm 30, and a second adhesion part 72*b* for adhering the outer edge of the outer cushion 70 to the diaphragm 30. Accordingly, it is possible to prevent the outer edge of the outer cushion 70 or the periphery of the through hole 70*a* from coming off the diaphragm 30.

In this way, by preventing the outer cushion 70 from coming off the diaphragm 30 of the striking surface head 3, the vibration of the diaphragm 30 can be effectively damped by the outer cushion 70. Further, by preventing the outer cushion 70 from coming off, it is possible to prevent a pressing force of the inner cushion 71 against the diaphragm 30 from weakening, and thus the vibration of the diaphragm 30 can be effectively damped by the cushion 7.

As shown in FIG. 4(*a*), the drum 1 is provided such that a plurality of (two in the embodiment) arc-shaped first adhesion parts 72*a* surround the periphery of the sensor part 4, but it is possible to connect the plurality of first adhesion parts 72*a* to each other and to surround the sensor part 4 with one first adhesion part 72*a*. Further, a plurality of (four in the embodiment) arc-shaped second adhesion parts 72*b* are provided over substantially the entire circumference of the outer edge of the outer cushion 70, but it is possible to connect the plurality of second adhesion parts 72*b* to each other and to provide one second adhesion part 72*b* over substantially the entire circumference of the outer edge of the outer cushion 70.

Since the sensor part 4 of the drum 1 is disposed at an eccentric position above the center of the striking surface head 3 (the diaphragm 30), the vibration amplitude of the diaphragm 30 is likely to increase in a region below the center of the striking surface head 3 (the diaphragm 30). Therefore, in the embodiment, the inner cushion 71 is adhered to the lower side of the center of the diaphragm 30, that is, to a side opposite to the sensor part 4 with the center of the diaphragm 30 interposed therebetween. Accordingly, the inner cushion 71 can be disposed in a region where the amplitude of the vibration of the diaphragm 30 is likely to increase (the vibration region where the amplitude is likely to increase can be divided), and thus the vibration in that region can be effectively damped by the cushion 7.

Further, the outer shape of the sensor part 4 (the disc 40) is formed in a circular shape in an axial direction of the drum 1, but the inner cushion 71 is formed in a curved shape that is convex in a direction away from the sensor part 4. That is, by disposing the circular sensor part 4 at a position eccentric from the center of the striking surface head 3 (the diaphragm 30), a substantially C-shaped region in which the sensor part 4 is not disposed is formed in the diaphragm 30, and the inner cushion 71 is also formed in a C shape along the region.

Accordingly, the inner cushion 71 can be disposed over the region where the sensor part 4 is not disposed, and the vibration region where the amplitude is likely to increase can be divided in a radial direction by one inner cushion 71. Therefore, the vibration in the region where the sensor part 4 is not disposed can be effectively damped while the number of the inner cushions 71 to be disposed is minimized.

The description will return to FIGS. 2 and 3. As described above, the diaphragm 30 of the striking surface head 3 vibrates when the sensor part 4 is struck, but a resonant head 8 is fixed to the end of the shell 2 on a side opposite to the striking surface head 3, and thus the resonant head 8 also vibrates to resonate with the vibration of the striking surface head 3. In the embodiment, the vibration of the resonant head 8 is damped by the cushion 9, and the configuration of the cushion 9 will be described below.

The resonant head 8 includes a diaphragm 80 and a frame 81. The diaphragm 80 has the same configuration as the diaphragm 30 of the striking surface head 3 except that the first through hole 30*a* and the second through hole 30*b* (see FIG. 2) are not formed. Further, a hoop 6 for fixing the resonant head 8 to the shell 2 has the same configuration as the hoop 6 for fixing the striking surface head 3.

The resonant head 8 is fixed to the shell 2 by the same fixing structure as the striking surface head 3 described above, and a cushion 9 is affixed to a back surface (a surface on the striking surface head 3 side) of the diaphragm 80 of the resonant head 8. The cushion 9 is constituted by a disc-shaped outer cushion 90 and the inner cushion 91 formed in a disc shape having a diameter smaller than that of the outer cushion 90. Both the outer cushion 90 and the inner cushion 91 are formed using a foamed synthetic resin of polyurethane foam or the like, and have a predetermined cushioning property.

The outer cushion 90 is partially adhered to the diaphragm 80 of the resonant head 8 by the double-sided tape 92 (see FIG. 3), and the inner cushion 91 is entirely adhered to the diaphragm 80 by the double-sided tape (not shown) in the same manner. The outer cushion 90 is affixed to the diaphragm 80 in a state in which the inner cushion 91 is interposed between the outer cushion and the diaphragm 80. Then, the inner cushion 91 is disposed in a region surrounded by the double-sided tape 92 (the adhesion portion between the diaphragm 80 and the outer cushion 90). Accordingly, the inner cushion 91 is pressed against the diaphragm 80, and thus a vibration region of the diaphragm 80 can be divided. Therefore, a vibration amplitude of the diaphragm 80 can be easily reduced, and thus the vibration of the diaphragm 80 is easily damped by the cushion 9.

As shown in FIG. 4(*b*), a plurality of (four in the embodiment) arc-shaped double-sided tapes 92 are provided on the drum 1 over substantially the entire circumference of the outer edge of the outer cushion 90, but the double-sided tapes 92 may be connected to each other and may be formed in a single annular shape.

As described above, in the diaphragm 30 of the striking surface head 3 (see FIG. 4(*a*)), the vibration amplitude is likely to increase in a region where the sensor part 4 is not installed, and as shown in FIG. 4(*b*), the sensor part 4 is not installed on the diaphragm 80 of the resonant head 8, and thus the vibration amplitude of the diaphragm 80 is likely to increase at the center of the diaphragm 80. Therefore, in the embodiment, the inner cushion 91 is adhered to the center of the diaphragm 80. Accordingly, the region where the vibration amplitude of the diaphragm 80 is likely to increase can be divided by the inner cushion 91, and thus the vibration in that region can be effectively damped by the cushion 9.

Further, since the area of the outer cushion 90 is set to a size over almost the entire region of the diaphragm 80 of the resonant head 8, the vibration of the diaphragm 80 is easily damped by the cushion 9. Further, almost the entire region of the diaphragm 80 is a region that is 70% or more of the area (the vibration region) of the diaphragm 80.

The inner cushion 91 is provided in the center of the outer cushion 90, and the outer edge of the outer cushion 90 is adhered to the diaphragm 80 by the double-sided tape 92, and thus the entire inner cushion 91 can be uniformly pressed toward the diaphragm 80.

Further, since substantially the entire circumference of the outer edge of the outer cushion 90 is adhered to the diaphragm 80 by the double-sided tape 92, the entire inner cushion 91 can be more uniformly pressed toward the diaphragm 80.

By uniformly pressing the entire inner cushion 91 against the diaphragm 80 of the resonant head 8, it is possible to suppress the occurrence of a weakly pressed portion on a part of the inner cushion 91, and thus the vibration of the diaphragm 80 can be effectively damped by the cushion 9.

In this way, in a case in which the inner cushions 71 and 91 should be pressed against the diaphragm 30 and the diaphragm 80, it is also possible to form the outer cushions 70 and 90 and the inner cushions 71 and 91 integrally and to provide convex portions corresponding to the inner cushions 71 and 91 on the outer cushions 70 and 90, for example. However, in such a configuration, when the outer cushions 70 and 90 are affixed to the diaphragm 30 and the diaphragm 80, it is difficult to confirm the relative positions of the inner cushions 71 and 91 with respect to the diaphragm 30 and the diaphragm 80, and thus it is difficult to affix the inner cushions 71 and 91 to the desired positions.

On the other hand, in the embodiment, the outer cushions 70 and 90 and the inner cushions 71 and 91 are formed separately. Accordingly, the inner cushions 71 and 91 can be affixed to the diaphragm 30 and the diaphragm 80 first (a first step), and then the outer cushions 70 and 90 can be affixed to the diaphragm 30 and the diaphragm 80 (a second step). Therefore, the inner cushions 71 and 91 can be reliably affixed to the diaphragm 30 and the diaphragm 80 at desired positions (regions in which the amplitude of vibration is likely to increase).

Further, since the outer cushions 70 and 90 and the inner cushions 71 and 91 are both formed of the same material (the same material and the same thickness), by cutting out the outer cushions 70 and 90 and the inner cushions 71 and 91 from a common sheet-shaped cushion material, the cushions 7 and 9 can be easily formed.

Here, if the damping of the vibrations of the diaphragm 30 and the diaphragm 80 should be simply accelerated, the diaphragm 30 and the diaphragm 80 have only to be formed using a net-shaped (mesh-shaped) material in which synthetic fibers are knitted. However, if the diaphragm 30 and the diaphragm 80 are formed in a net shape, it is difficult to obtain a feeling of striking when they are struck.

On the other hand, in the embodiment, the diaphragm 30 and the diaphragm 80 are formed using a film made of synthetic resin. That is, the diaphragm 30 and the diaphragm 80 are formed using a material having lower air permeability than the net-shaped material, and have substantially no air permeability. Therefore, it is easy to obtain a feeling of striking when the diaphragm 30 and the diaphragm 80 are struck.

On the other hand, since the diaphragm 30 and the diaphragm 80 have substantially no air permeability, the vibrations of the diaphragm 30 and the diaphragm 80 are more difficult to damp than they would be if they had the net shape, but the vibrations are effectively damped by the cushions 7 and 9 described above. Therefore, according to the drum 1 of the embodiment, it is possible to obtain both a feeling of striking when the diaphragm 30 (the sensor part 4) and the diaphragm 80 are struck, and to accelerate the damping of the vibrations of the diaphragm 30 and the diaphragm 80.

Next, with reference to FIG. 5, the result of a striking test on the striking surface head 3 (the sensor part 4) performed using the drum 1 configured as described above will be described. In this striking test, the drum 1 of the embodiment described above and drums of first to third comparative examples described below are used to compare the degrees of the damping of the volumes (effective values of sound pressure) when the striking surface head 3 is struck. In all of the drums of the embodiment and the first to third comparative examples, the striking surface head 3 (the sensor part 4) is struck in a state in which the resonant head 8 is removed, and the striking sound is measured with a microphone disposed at a position 50 cm away from the striking surface head 3.

The first comparative example is a drum having the same configuration as the drum 1 described above except that the cushion 7 is not affixed to the striking surface head 3. The second comparative example is a drum in which only the outer cushion 70 is entirely adhered to the striking surface head 3 of the drum of the first comparative example.

FIG. 5(*a*) is a graph showing a result of a drum striking test of the first comparative example, and FIG. 5(*b*) is a graph showing a result of a drum striking test of the second comparative example. A vertical axis of FIG. 5 indicates the level of the amplitude (the volume) of the striking sound, and a horizontal axis thereof indicates the time. Further, the scales of the vertical axes of FIGS. 5(*a*) to 5(*d*) are the same.

As shown in FIGS. 5(*a*) and 5(*b*), the result is that, in the drum of the second comparative example (see FIG. 5 (*b*)) in which the outer cushion 70 is entirely adhered to the diaphragm 30, the damping of the volume generated when the diaphragm 30 of the striking surface head 3 is struck is slightly more accelerated than in the drum of the first comparative example (see FIG. 5(*a*)) in which the cushion 7 is not installed on the diaphragm 30 of the striking surface head 3.

Specifically, as compared with the volume at the time of striking the striking surface head 3 of the first comparative example, the volume generated at the time of striking the striking surface head 3 of the second comparative example was reduced to the extent of 3 dB (if the volume measured in the first comparative example was 100%, the volume measured in the second comparative example was reduced to 70%). This result is considered to be due to the fact that, in the drum of the second comparative example, the weight of the diaphragm 30 of the striking surface head 3 was increased by adhering the outer cushion 70 thereto, and the vibration of the diaphragm 30 was restrained by the outer cushion 70.

FIG. 5(*c*) is a graph showing a result of a drum striking test of the third comparative example. The third comparative example is a drum in which the outer cushion 70 is partially adhered to the diaphragm 30 of the striking surface head 3 of the drum of the second comparative example. In the partial adhesion in the third comparative example, as in the drum 1 described above, only the outer edge of the outer cushion 70 is adhered to the diaphragm 30 by the double-sided tape 92. That is, the drum of the third comparative example has the same configuration as the drum 1 of the embodiment except that the inner cushion 71 is omitted from the cushion 7 and only the outer cushion 70 is adhered to the diaphragm 30.

As shown in FIG. 5(*c*), the result is that, in the drum of the third comparative example in which only the outer cushion 70 is partially adhered, the damping of the volume generated when the diaphragm 30 of the striking surface head 3 is struck is more accelerated than in the drum of the second comparative example.

Specifically, as compared with the volume at the time of striking the striking surface head 3 of the first comparative example, the volume generated at the time of striking the striking surface head 3 of the third comparative example was reduced to the extent of 6 dB (if the volume measured in the first comparative example was 100%, the volume measured in the third comparative example was reduced to 50%). This result is considered to be due to the fact that, when the outer cushion 70 was entirely adhered as in the second comparative example, the outer cushion 70 and the diaphragm 30 of the striking surface head 3 vibrated integrally, whereas, in the third comparative example, the outer cushion 70 was entirely adhered, and thus the outer cushion 70 and the diaphragm 30 can vibrate with different behaviors.

As shown in FIG. 5(*d*), the result is that, in the drum 1 of the embodiment, the damping of the volume generated when the diaphragm 30 of the striking surface head 3 is struck is further accelerated than in the drum of the third comparative example.

Specifically, as compared with the volume at the time of striking the striking surface head 3 of the first comparative example, the volume generated at the time of striking the striking surface head 3 of the drum 1 of the embodiment was reduced to the extent of 9 dB (if the volume measured in the first comparative example was 100%, the volume measured in the embodiment was reduced to 35%). This result is considered to be due to the fact that the inner cushion 71 was pressed against the diaphragm 30 of the striking surface head 3 by the outer cushion 70, and thus the vibration region of the diaphragm 30 was divided and the vibration of the diaphragm 30 is easily damped, as described above.

As described above, according to the drum 1 of the embodiment, the inner cushions 71 and 91 are interposed between the outer cushions 70 and 90 and the diaphragms 30 and 80 of the striking surface head 3 and the resonant head 8, and thus the inner cushions 71 and 91 are pressed against the diaphragms 30 and 80. Therefore, the vibration regions of the diaphragms 30 and 80 are divided and the vibration amplitudes thereof can be easily reduced, and thus the vibrations of the diaphragms 30 and 80 can be effectively damped by the cushions 7 and 9.

Figure 6A:
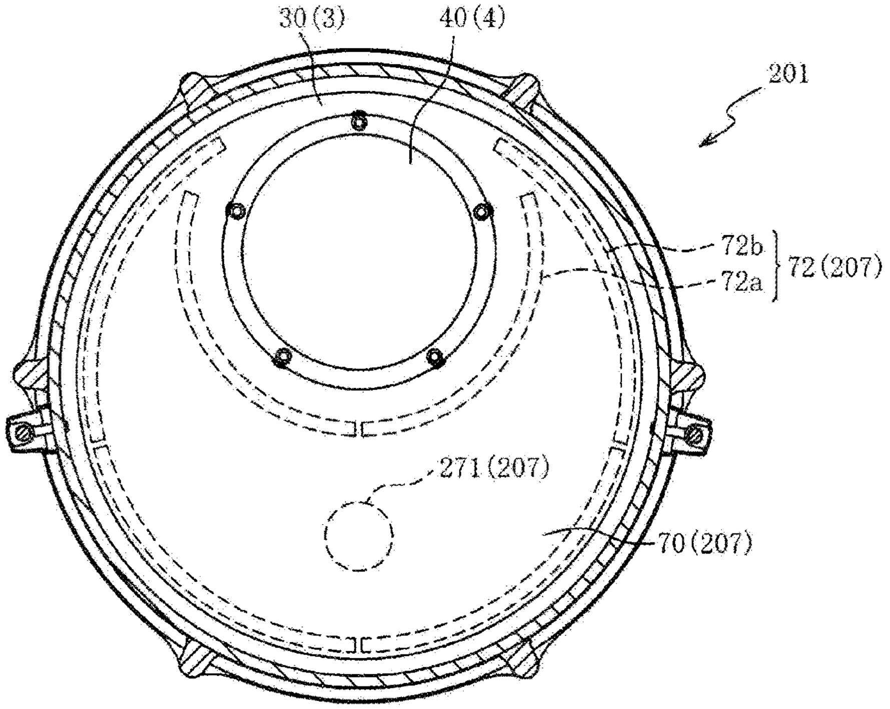
FIGS. 6(*a*) and 6(*b*) are cross-sectional views of a drum showing a first modification example.
Figure 6B:
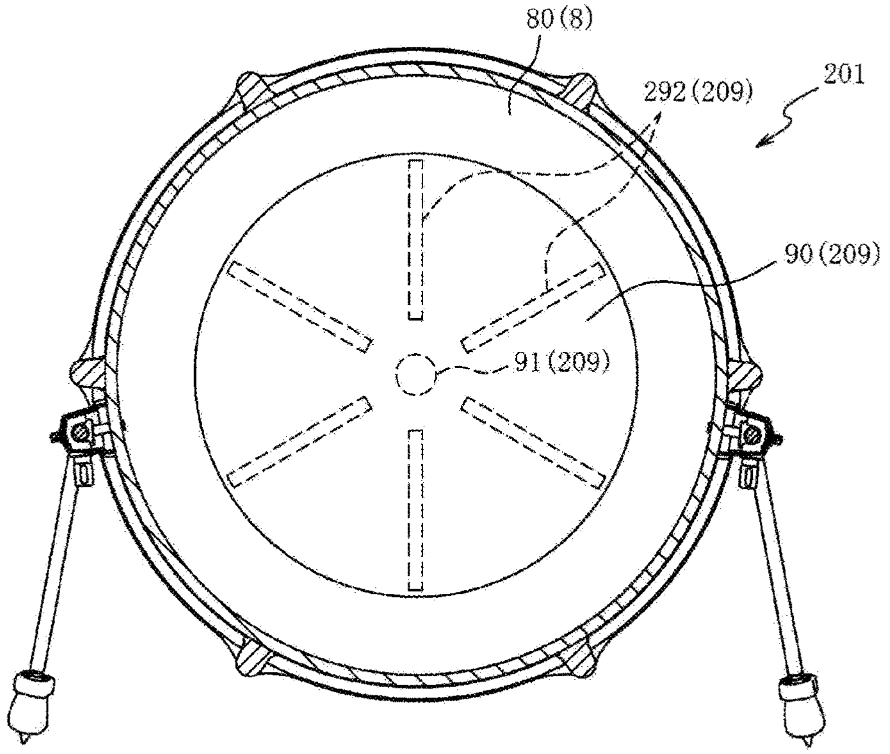

Next, modification examples of the drum 1 will be described with reference to FIGS. 6(*a*), 6(*b*) to 8(*a*) and 8(*b*). The same portions as those of the drum 1 described above are designated by the same reference numerals, and the description thereof will be omitted. FIGS. 6(*a*), 6(*b*) to 8(*a*) and 8(*b*) are cross-sectional views of drums 201, 301, and 401 showing first to third modification examples. Further, FIGS. 6(*a*), 6(*b*) to 8(*a*) and 8(*b*) show cross sections at a position corresponding to FIG. 4.

As shown in FIGS. 6(*a*) and 6(*b*), the drum 201 of the first modification example includes a cushion 207 that is affixed to the diaphragm 30 of the striking surface head 3 and a cushion 209 that is affixed to the diaphragm 80 of the resonant head 8. The cushion 207 has the same configuration as the cushion 7 described above except that the configuration of an inner cushion 271 is different, and the cushion 209 has the same configuration as the cushion 9 described above except that the configuration of a double-sided tape 292 is different.

The inner cushion 271 of the cushion 207 is formed in a disc shape having a diameter smaller than that of the outer cushion 70 (the disc 40 of the sensor part 4), and the outer cushion 70 is affixed to the diaphragm 30 by the double-sided tape 72 in a state in which the inner cushion 271 is interposed between the outer cushion 70 and the diaphragm 30 of the striking surface head 3. Accordingly, the vibration region of the diaphragm 30 is divided and the vibration amplitude of the diaphragm 30 can be easily reduced, and thus the vibration of the diaphragm 30 can be effectively damped by the cushion 207.

Since the inner cushion 271 is disposed on the lower side of the center of the diaphragm 30, that is, on a side opposite to the sensor part 4 with the center of the diaphragm 30 interposed therebetween, the inner cushion 271 can be provided in a region where the amplitude of the vibration of the diaphragm 30 is likely to increase (the vibration region where the amplitude is likely to increase can be divided). Therefore, the vibration in such a region can be effectively damped by the cushion 207.

Further, since the inner cushion 271 is disposed on a side opposite to the sensor part 4 with the center of the diaphragm 30 interposed therebetween, the inner cushion 271 can be disposed at a position where the distance between the first adhesion part 72*a* and the second adhesion part 72*b* of the double-sided tape 72 in a radial direction of the sensor part 4 (the disc 40) is the longest. Accordingly, the inner cushion 271 can be disposed at a position where the vibration node of the diaphragm 30 is the longest, and thus the vibration of the diaphragm 30 can be effectively damped by one inner cushion 271.

The double-sided tape 292 of the cushion 209 is formed radially around the inner cushion 91. That is, the double-sided tape 292 is formed in a linear shape extending in a radial direction of the outer cushion 90, and a plurality of double-sided tapes 292 (six in the embodiment) are provided side by side in a circumferential direction of the outer cushion 90. Accordingly, the distance between the double-sided tape 292 and the inner cushion 91 can be shortened as compared with the cushion 9 described above, and thus the inner cushion 91 can be strongly pressed against the diaphragm 80 of the resonant head 8. Therefore, the vibration of the diaphragm 80 can be effectively damped by the cushion 209.

Further, by providing, in the circumferential direction, a plurality of double-sided tapes 292 that extend in the radial direction of the outer cushion 90, the outer cushion 90 can be adhered at a position (the center side of the diaphragm 80) where the amplitude of the diaphragm 80 of the resonant head 8 is likely to increase. Accordingly, the vibration of the diaphragm 80 can be effectively damped by the outer cushion 90 as well.

Figure 7A:
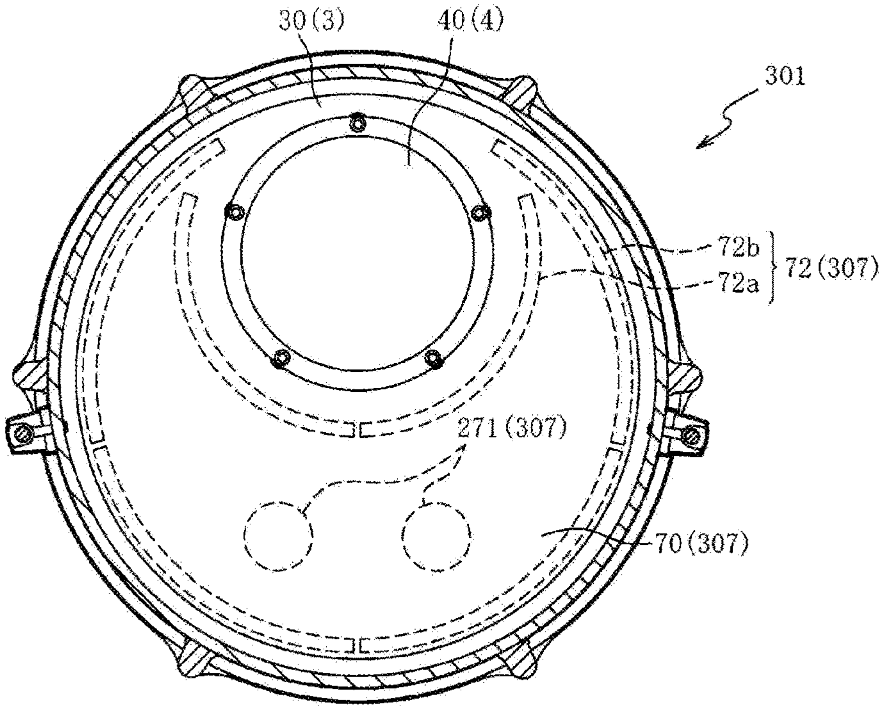
FIGS. 7(*a*) and 7(*b*) are cross-sectional views of a drum showing a second modification example.
Figure 7B:
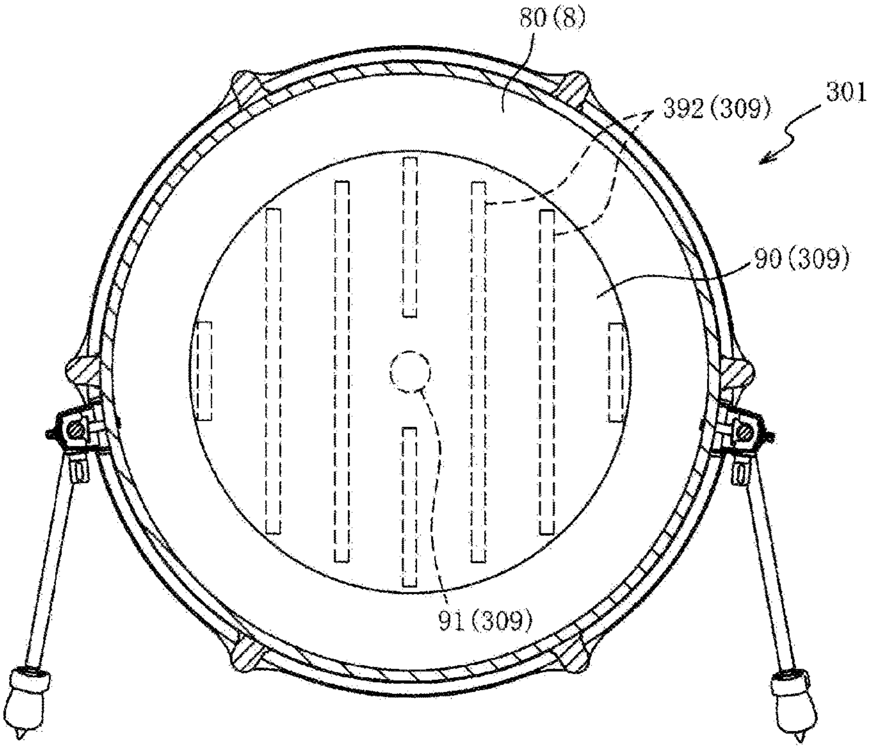

As shown in FIGS. 7(*a*) and 7(*b*), the drum 301 of the second modification example includes a cushion 307 that is affixed to the diaphragm 30 of the striking surface head 3 and a cushion 309 that is affixed to the diaphragm 80 of the resonant head 8. The cushion 307 has the same configuration as the cushion 7 described above except that a plurality of inner cushions 271 described above are provided, and the cushion 309 has the same configuration as the cushion 9 described above except that the configuration of a double-sided tape 392 is different.

A pair of inner cushions 271 of the cushion 307 is disposed on a side opposite to the sensor part 4 with the center of the diaphragm 30 interposed therebetween, and the pair of inner cushions 271 is provided side by side in the circumferential direction. Accordingly, the C-shaped region surrounded by the first adhesion part 72*a* and the second adhesion part 72*b* of the double-sided tape 72 can be divided in the radial direction by the pair of inner cushions 271.

Therefore, as compared with the cushion 7 described above, the inner cushion 271 can divide the region where the vibration amplitude of the diaphragm 30 is likely to increase while reducing the adhesion area of the inner cushion 271. Therefore, the vibration of the diaphragm 30 can be effectively damped by the cushion 307 while reducing the product cost of the cushion 307 (the drum 1).

The double-sided tape 392 of the cushion 309 is formed in a linear shape extending vertically (in one direction) of the diaphragm 80 of the resonant head 8, and a plurality of linear double-sided tapes 392 are provided side by side in a left-right direction (a direction orthogonal to one direction) of the diaphragm 80). Accordingly, the entire outer cushion 90 can be uniformly affixed to the diaphragm 80 while preventing the outer cushion 90 from being entirely adhered.

To uniformly affix the entire outer cushion 90 to the diaphragm 80, the adhesion area of the outer cushion 90 has only to be large, but if the adhesion area is too large, the diaphragm 80 and the outer cushion 90 is likely to vibrate integrally. Therefore, the adhesion area of the outer cushion 90 to the diaphragm 80 (the area of the double-sided tape 392) is preferably 50% or less of the area of the outer cushion 90.

Figure 8A:
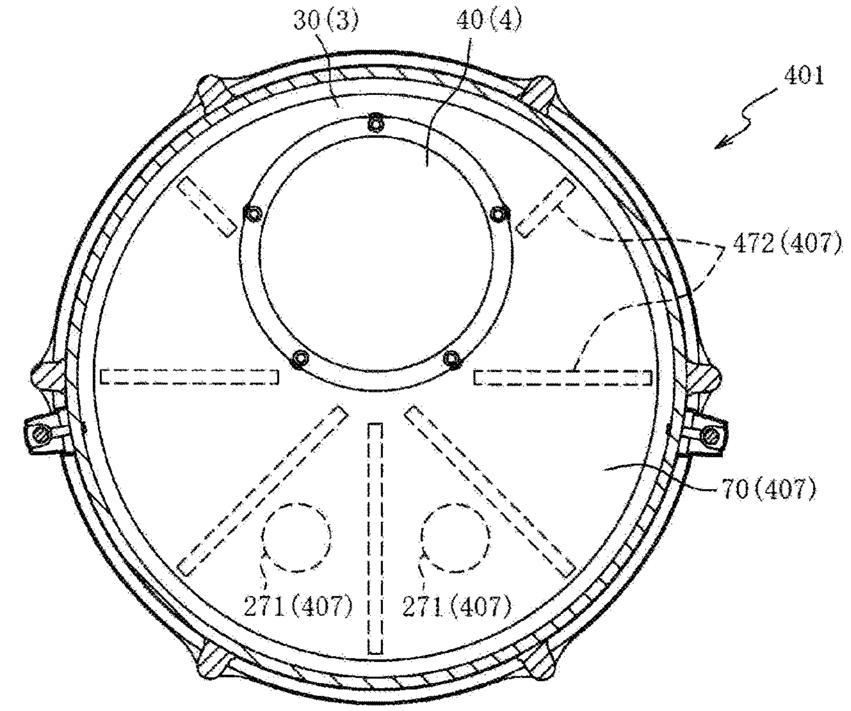
FIGS. 8(*a*) and 8(*b*) are cross-sectional views of a drum showing a third modification example.
Figure 8B:
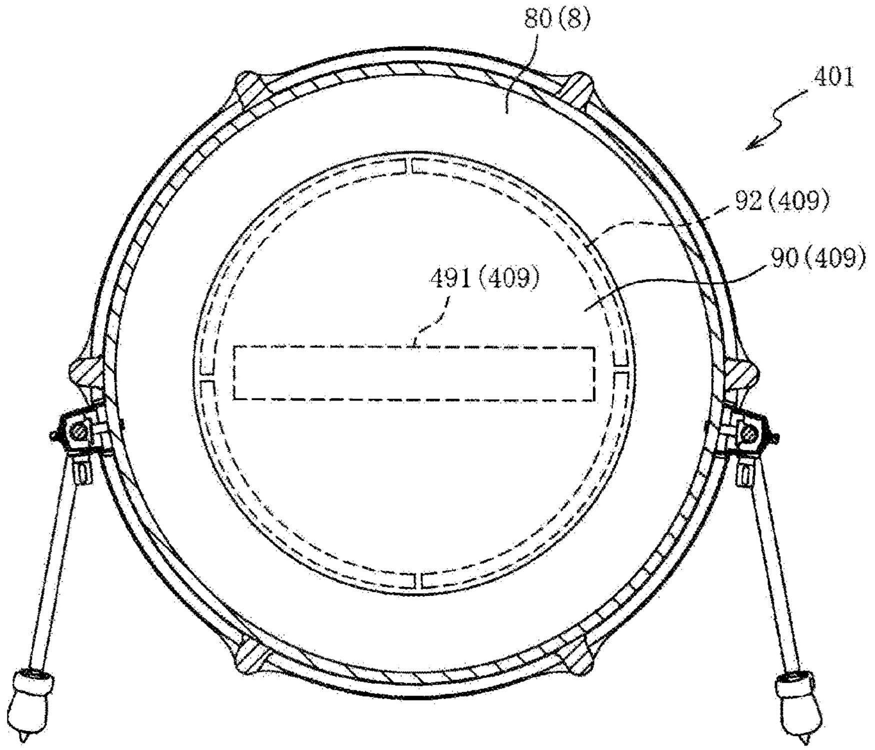

As shown in FIGS. 8(*a*) and 8(*b*), the drum 401 of the third modification example includes a cushion 407 that is affixed to the striking surface head 3 and a cushion 409 that is affixed to the resonant head 8. The cushion 407 has the same configuration as the cushion 307 described above except that a double-sided tape 472 is provided radially, and the cushion 409 has the same configuration as the cushion 9 described above except that the configuration of an inner cushion 491 is different.

The double-sided tape 472 of the cushion 407 is formed radially around the center of the outer cushion 70. That is, the double-sided tape 472 is formed in a linear shape extending in a radial direction of the outer cushion 70, and a plurality of double-sided tapes 472 (seven in the embodiment) are provided side by side in a circumferential direction of the outer cushion 70. Accordingly, the outer cushion 70 can be adhered to the region where the amplitude of the diaphragm 30 of the striking surface head 3 is likely to increase (the substantially C-shaped region where the sensor part 4 is not disposed), and thus the vibration of the diaphragm 30 can be effectively damped by the outer cushion 70 as well.

Further, by providing, in the circumferential direction, a plurality of double-sided tapes 472 that extend in the radial direction of the outer cushion 70, the region where the amplitude of the diaphragm 30 is likely to increase (the substantially C-shaped region where the sensor part 4 is not disposed) can be divided into a plurality of regions by the double-sided tapes 472. Therefore, the vibration of the diaphragm 30 in such a region can be effectively damped by the cushion 407.

Since a pair of inner cushions 271 are provided between the plurality of double-sided tapes 472 arranged in the circumferential direction, the inner cushions 271 can be disposed in the vibration regions divided in the circumferential direction by the double-sided tapes 472. Accordingly, the vibration of the diaphragm 30 can be effectively damped by the cushion 407.

The inner cushion 491 of the cushion 409 is formed in a linear shape extending to the left and right. Accordingly, the vibration region of the diaphragm 80 of the resonant head 8 can be divided into upper and lower parts, and thus the vibration of the diaphragm 80 can be effectively damped by the cushion 409.

The above description has been made based on the above-described embodiment, but the disclosure is not limited to the above-described embodiment, and it is easily inferred that various improvements and modifications can be made without departing from the spirit of the disclosure.

In the above-described embodiment, the case where the drum 1, 201, 301, or 401 is configured as a bass drum has been described, but the disclosure is not necessarily limited to this. For example, it may be configured as a snare or tom-tom drum.

In the above-described embodiment, the cases where the sensor part 4 is provided on the striking surface head 3 of the drum 1, 201, 301, or 401 has been described, but the disclosure is not necessarily limited to this. For example, the sensor part 4, and the first through hole 30*a* and the second through hole 30*b* of the diaphragm 30 of the striking surface head 3 may be omitted. That is, the drum 1, 201, 301, or 401 may be configured as an acoustic drum.

Further, in a case in which the first through hole 30*a* and the second through hole 30*b* of the diaphragm 30 are omitted, the cushion 9, 209, 309, or 409 may be affixed to the diaphragm 30.

In the above-described embodiment, the diaphragm 30 and the diaphragm 80 are formed using a material having lower air permeability than the net-shaped material, and a synthetic resin film is exemplified as an example of the material, but the disclosure is not necessarily limited to this. For example, the diaphragm 30 and the diaphragm 80 may be formed using real leather. That is, the material having lower air permeability than the net-shaped material is a material that does not have holes that penetrate in a thickness direction of the drum head and has substantially no air permeability.

In the above-described embodiment, as an example of an attachment that is attached to the striking surface head 3, the sensor part 4 including the disc 40 and the protrusion 41 has been illustrated, but the disclosure is not necessarily limited to this. For example, other known attachments such as the attachment described in WO2017/038226 may be attached to the striking surface head 3 or the resonant head 8. The shape or affix region of the cushion has only to be appropriately set according to the shape and disposition of the attachment, and the cushion has only to be provided at a position avoiding the attachment.

In the above-described embodiment, the adhesion with the double-sided tape has been exemplified as a method of joining the outer cushions 70 and 90 or the inner cushions 71, 271, 91, and 491 to the diaphragm 30 and the diaphragm 80, but the disclosure is not necessarily limited to this. For example, as such a joining method, a known joining method such as joining with a suture or an adhesive can be applied as long as the outer cushion or the inner cushion can be fixed to the diaphragm of the drum head.

In the above-described embodiment, the case in which the area of the outer cushions 70 and 90 is 70% or more of the area of the diaphragm 30 and the diaphragm 80 has been described, but the disclosure is not necessarily limited to this. For example, the area of the outer cushion has only to be at least 50% or more of the area of the diaphragm (the vibration region) of the drum head.

In the above-described embodiment, the case in which the outer cushion 70 is fixed between the striking surface head 3 (the diaphragm 30) and the sensor part 4 (the disc 40) while interposed therebetween has been described, but the disclosure is not necessarily limited to this. For example, the sensor part 4 and the outer cushion 70 may be in a non-contact structure.

In the above-described embodiment, the case in which the outer cushions 70 and 90 and the inner cushions 71, 271, 91, and 491 are formed in a disc shape, a C shape, or a linear shape has been described, but the disclosure is not necessarily limited to this. For example, the outer shape of each of the outer cushion and the inner cushion can be appropriately set to a shape such as a polygon or an ellipse, or a shape combining straight lines and curves (for example, a semicircle).

In the above-described embodiment, the case in which the outer cushions 70 and 90 and the inner cushions 71, 271, 91, and 491 are formed separately has been described, but the disclosure is not necessarily limited to this. For example, the outer cushions 70 and 90 and the inner cushions 71, 271, 91, and 491 may be integrally formed.

In the above-described embodiment, the case in which the outer cushions 70 and 90 and the inner cushions 71, 271, 91, and 491 are formed of the same material and the same thickness has been described, but the disclosure is not necessarily limited to this. For example, the outer cushions and the inner cushions may be formed of different materials or different thicknesses.

In the above-described embodiment, the case in which the outer cushions 70 and 90 and the inner cushions 71, 271, 91, and 491 are formed using the foamed synthetic resin of polyurethane foam has been described, but the disclosure is not necessarily limited to this. For example, the cushions may be formed using other foamed synthetic resins (polyethylene foam, polyolefin foam, polyvinyl chloride foam, melamine foam, polyimide foam, and the like), or other rubbers or elastomers. That is, the materials of the outer cushions and the inner cushions can be appropriately set as long as they have a cushioning property for damping the vibration of the diaphragm of the drum head.

In the above-described embodiment, the periphery of the through hole 70*a* of the outer cushion 70 is adhered by the first adhesion part 72*a* of the double-sided tape 72, but the disclosure is not necessarily limited to this. For example, the first adhesion part 72*a* may be omitted.

In the above-described embodiment, the case in which the double-sided tape 292 is formed in a linear shape extending in the radial direction in a case in which the plurality of double-sided tapes 472 and 292 is provided radially has been described, but the disclosure is not necessarily limited to this. For example, the double-sided tapes 472 and 292 may be curved (bent) at a part of the drum head (the diaphragm) in the radial direction, or may have a shape in which the curving (bending) is repeated. That is, a "joint extending in the radial direction" is not limited to a joint extending in a linear shape in the radial direction.

What is claimed is:

1. A drum comprising:

a diaphragm comprising a first through hole;

an outer cushion that is joined to the diaphragm and has a predetermined cushioning property;

an inner cushion that is interposed between the outer cushion and the diaphragm and has a predetermined cushioning property; and a plurality of joints that join the outer cushion to the diaphragm in a state in which the inner cushion is pressed against the diaphragm by the outer cushion, wherein the joints are configured to surround the inner cushion;

an attachment comprising a sensor for detecting vibration on the diaphragm is attached to the diaphragm through the first through hole of the diaphragm, wherein the joints are disposed on a surface of the diaphragm and on a surface of the outer cushion, and the joints are disposed between the outer cushion and the diaphragm, and a pedal configured to strike the diaphragm with a beater configured to rotate in response to a depression of the pedal, wherein the inner cushion is provided on a side opposite to the attachment with a center of the diaphragm interposed between the attachment and the inner cushion, and wherein the attachment is disposed at a position eccentric above a center of the diaphragm.

2. The drum according to claim 1, wherein the outer cushion and the inner cushion are formed separately.

3. The drum according to claim 1, wherein the inner cushion is provided in a region where a vibration amplitude of the diaphragm is easily increased.

4. The drum according to claim 3, wherein the inner cushion is provided on a center side of the diaphragm and the outer cushion, and wherein the joints join an outer edge of the outer cushion to the diaphragm.

5. The drum according to claim 4, wherein the joints extend in a radial direction of the diaphragm, the joints are provided in a circumferential direction.

6. The drum according to claim 4, wherein the joints join the outer edge of the outer cushion to the diaphragm over substantially an entire circumference of the outer cushion.

7. The drum according to claim 1, wherein the outer cushion comprises a second through hole formed at a position corresponding to disposition of the attachment, and wherein the attachment is configured to be fixed to the diaphragm through the second through hole.

8. The drum according to claim 7, wherein the outer cushion is fixed between the diaphragm and the attachment in a state in which a periphery of the second through hole is interposed between the diaphragm and the attachment.

9. The drum according to claim 7, wherein the joints comprise at least a first joint that joins a periphery of the second through hole to the diaphragm and a second joint that joins an outer edge of the outer cushion to the diaphragm.

10. The drum according to claim 1, wherein an outer shape of the attachment is formed in a circular shape, and wherein the inner cushion is formed in a curved shape that is convex in a direction away from the attachment.

11. The drum according to claim 1, wherein the joints extend in a radial direction of the diaphragm, the joints are arranged in a circumferential direction.

12. The drum according to claim 11, wherein the inner cushion is provided between the plurality of joints arranged in the circumferential direction.

13. The drum according to claim 1, wherein the diaphragm is formed using a material having lower air permeability than a net-shaped material.

14. An attachment method of a cushion in a drum, the drum comprising a diaphragm; and the cushion comprising an outer cushion and an inner cushion which are joined to the diaphragm and have a predetermined cushioning property, the method comprising:

providing the diaphragm with a first through hole formed thereon;

a first step of joining the inner cushion to the diaphragm;

a second step of, after the first step, joining the outer cushion to the diaphragm by pressing the inner cushion against the diaphragm by the outer cushion;

attaching an attachment on the diaphragm through the first through hole at a position eccentric above a center of the diagram, wherein the attachment comprising a sensor for detecting vibration on the diagram; and providing a pedal configured to strike the diaphragm with a beater configured to rotate in response to a depression of the pedal, wherein a plurality of joints are configured to surround the inner cushion, and wherein the joints are disposed on a surface of the diaphragm and on a surface of the outer cushion, and the joints are disposed between the outer cushion and the diaphragm, and wherein the inner cushion is provided on a side opposite to the attachment with a center of the diaphragm interposed between the attachment and the inner cushion.

15. The attachment method of a cushion according to claim 14, wherein, in the first step, the inner cushion is provided in a region where a vibration amplitude of the diaphragm is easily increased.

16. The attachment method of a cushion according to claim 15, wherein, in the first step, the inner cushion is provided on a center side of the diaphragm and the outer cushion, and wherein, in the second step, an outer edge of the outer cushion is joined to the diaphragm.

17. The attachment method of a cushion according to claim 16, wherein, in the second step, a double-sided tape is formed in a linear shape extending in a radial direction of the diaphragm and a plurality of the double-sided tapes are provided in a circumferential direction of the outer cushion, to join the outer cushion to the diaphragm.

18. The attachment method of a cushion according to claim 16, wherein, in the second step, the outer edge of the outer cushion is joined to the diaphragm over substantially an entire circumference of the outer cushion.

19. The attachment method of a cushion according to claim 14, wherein the diaphragm is formed using a material having lower air permeability than a net-shaped material.

* * * * *